H. C. HUBBELL.
PROCESS OF MAKING STORAGE BATTERY ELECTRODES.
APPLICATION FILED JULY 17, 1911.

1,092,267. Patented Apr. 7, 1914.

WITNESSES:

INVENTOR
Harry C. Hubbell
BY
Frank J. Kent
ATTORNEY

UNITED STATES PATENT OFFICE.

HARRY CROSS HUBBELL, OF NEWARK, NEW JERSEY.

PROCESS OF MAKING STORAGE-BATTERY ELECTRODES.

1,092,267.  Specification of Letters Patent.  Patented Apr. 7, 1914.

Application filed July 17, 1911.  Serial No. 638,941.

*To all whom it may concern:*

Be it known that I, HARRY CROSS HUBBELL, a citizen of the United States, residing at Newark, in the county of Essex and State of New Jersey, have invented certain new and useful Improvements in Processes of Making Storage-Battery Electrodes, of which the following is a specification.

My invention relates to a process of making an improved storage battery electrode which is oxidized on charge and which has advantages hereinafter pointed out. Nickel is the metal which I prefer in the active material for the electrode, but I may substitute therefor cobalt or iron.

Figure 1:
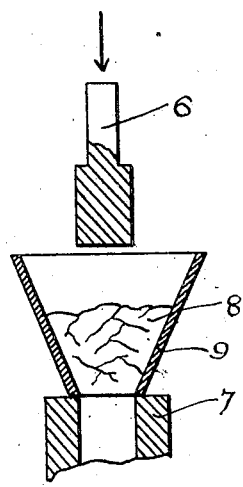
Figure 2:
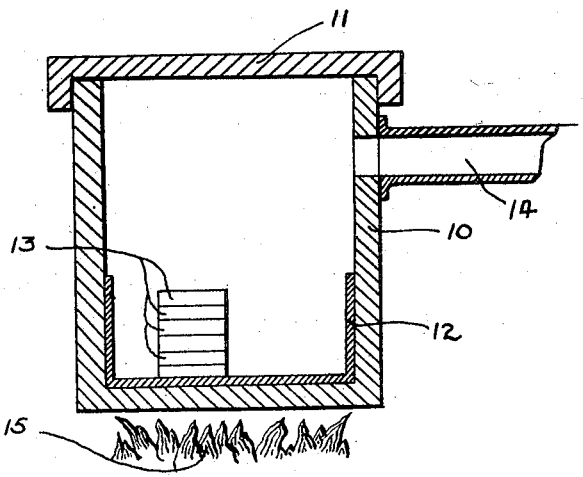
Figure 3:
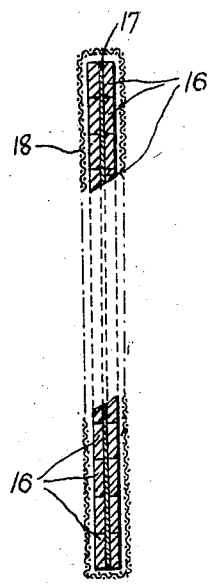
Figure 4:
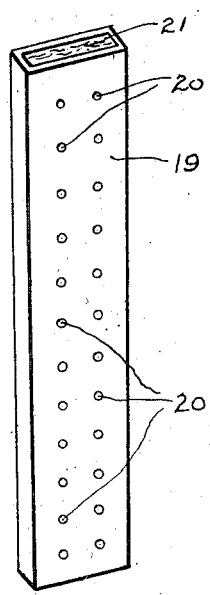
Figure 5:
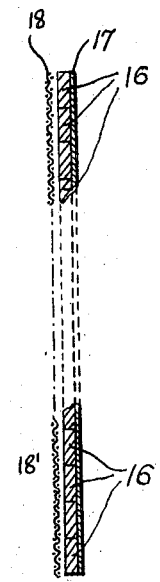

Referring now to the accompanying drawing, Figure 1 is a diagrammatic sectional view showing the plunger 6 which is utilized to coöperate with the die 7 in forming briquets under heavy pressure, the briquet material 8 being located in the hopper 9, said material being the oxid of nickel hereinafter referred to; Fig. 2 is a similar view, showing the cylinder 10, the cover 11, the asbestos lining 12 and the inlet pipe 14 for the hydrogen or illuminating gas, the briquet 13, and the heating flame 15, hereinafter referred to; Fig. 3 is a longitudinal sectional view of an electrode hereinafter described, showing in assembly the tablets 16 (made as below-described after the briquets 13 shown in Fig. 2 are as below-described immersed in a dilute solution of sodium or potassium hydrate, then taken out and ground into a fine powder and dried, and then briqueted into said tablets 16), the conducting strip 17 and the gauze envelop 18, hereinafter referred to; Fig. 4 is a perspective view, showing the pocket 19, the perforations 20 therein, and the silver oxid 21 rammed thereinto, hereinafter referred to in the paragraph hereof beginning "The necessity and importance of the conducting strip," etc.; and Fig. 5 is a view similar to Fig. 3, showing one of the "end electrodes" and disclosing in assembly said tablets 16, said strip 17 and said gauze envelop 18, hereinafter referred to.

Similar reference characters refer to similar posts throughout the several views of the drawing.

Assuming that nickel is to be my active material I will describe the preferred operation of the process. As declared in Fig. 1 I take an oxid of nickel 8 which is reducible by hydrogen, preferably black anhydrous sesquioxid of nickel, and place the same in a hopper 9. This I form into briquets 13 (see Fig. 3) under heavy pressure, utilizing for purposes of illustration the plunger 6 and die 7 shown in Fig. 1, which I then heat (and now see Fig. 2) in an atmosphere of hydrogen or ordinary illuminating gas transmitted through the pipe 14 in an iron cylinder 10 (lined with asbestos 12 to prevent overheating the material where the heating flame 15 is applied to the cylinder) until the oxid is reduced to the metal, care being taken that the temperature is not high enough to fuse or weld the material of the briquets. The top 11 of the cylinder is then opened preferably while still hot and the briquets immediately dumped into a dilute solution of sodium or potassium hydrate. In this way atmospheric oxidation of the finely divided nickel is prevented, which is important since this would result in an electrolytically inactive oxid. The material remains in the alkali solution for say half an hour whereupon the solution is drained off and the damp material is ground into a fine powder and thereafter dried. This powder I then again briquet into small tablets 16 (see Figs. 3 and 5) ready for use in the make-up of the electrode. I find the material of these tablets exceedingly active and efficient, but in order to hasten the complete oxidation throughout their mass, I prefer to mix with the material before briqueting it as described into tablet form, a sufficient quantity of a nickel hydrate to amount to about ten per cent. (10%) by weight of the whole mixture. This addition increases the porosity of the tablet. The material so made whether with or without the addition of the nickel hydrate takes up and parts with hydroxyl and in general oxidizes and reduces with surprising ease in an alkaline electrolyte.

I believe that the briquets as they come from the retort are substantially finely divided nickel which if in the form of a loose powder would instantly oxidize in the air into an electrolytically inactive material,— but the fact that it is in the form of briquets prevents this. Finally the alkaline solution into which the reduced material is dumped seems to effect a change, which gives the material additional immunity against oxidation in the air, because the tablets formed as described from the ground and dried material that has been exposed to the air for twenty-four hours gives the same excellent results that the same material gives when immediately briqueted into tablets and used in the battery. Another advantage of reducing the material in the retort in the form of briquets is that they instantly sink when dumped into the alkaline solution instead of floating on the surface and becoming oxidized which the fine reduced material persists in doing. Cobalt may be substituted for nickel in the above,— the process being substantially the same, except that it is started with a hydrogen-reducible oxid of cobalt and the addition-material to facilitate oxidation through the mass will be a cobalt-hydrate. Iron may similarly be substituted for the nickel, in which event I can use the resulting electrode both as the oxygen storing element on charge and as the reduced element on charge. When used as the oxygen storing element I prefer to mix with the iron material about ten per cent. (10%) of iron monoxid; and when used as the reduced element I prefer to mix with it ten per cent. (10%) of cadmium oxid.

The tablets 16 above spoken of, I prefer to make about $\frac{6}{16}''$ square and from $\frac{1}{16}$ to $\frac{1}{8}''$ thick. I then take a conducting strip 17 (see Fig. 3), preferably a nickel-plated iron strip $1\frac{1}{4}'' \times 5\frac{1}{2}''$ for a small portable battery and assemble 18 of these tablets 16 flat against each side of the strip. The whole is then fitted into a containing envelop 18 of nickel-plated iron gauze (see said Fig. 3). This produces what I call a double plate or electrode. The important fact here is the middle conducting strip which makes it unnecessary to mix conducting nickel or other filaments with the active material, thereby eliminating the expense and increased bulk and trouble thereon. Further, the conducting strip permits the tablets to be made thicker than would otherwise be possible and yet obtain oxidation as well as the reverse electrolytic action through the mass.

The necessity and importance of the conducting strip may be made plain from the following experiment. I chemically formed silver oxid and rammed it down as shown at 21 in Fig. 4 into a pocket 19 having sides of metal with perforations 20. The plate so produced was about 6" long, 1" wide and $\frac{1}{8}''$ thick. When made into a primary battery in an alkaline solution with an amalgamated zinc, I obtained a discharge of something like 8 ampere-hours. I then used the couple as a storage battery in the attempt to reform the silver oxid from the spongy silver, but was unable to do so to any substantial depth, the whole interior of the plate remaining unoxidized in spite of many hours of attempted electrolytic oxidation. It seems that the silver oxid, formed on the surface, (good conducting compared to other oxids as it is) was of high enough resistance to practically cut off the interior mass of sponge silver, in spite of the fact that there is practically no metal so easily oxidized and reduced as silver in an alkaline solution. I then took the same plate and put a thin strip of metal, say copper or nickel, down through the center of it with the sponge silver on either side and upon subjecting it to electrolytic oxidation found that it was practically easy to oxidize the sponge silver completely. In short the experiment shows that it was impossible to obtain oxidation through a mass of even sponge silver, easily oxidizable as that material is,—where merely external contacts such as the perforated walls of the pocket were depended upon,—whereas the same material used with a conducting strip like a partition through the center of the pocket gave thorough oxidation. The same idea applies to the present electrode as above described.

For the end electrodes (and now see Fig. 5) I put the tablets 16 on only one side of the conducting strip 17, which then constitutes one side of the container, the other side being the nickel-plated gauze 18. In this case the electrode is only of about one-half the thickness of the first described or double electrode. It will be understood that the end electrode is positioned, so that its gauze or perforated side 18' faces inwardly toward the adjacent electrode, whereas its other side, consisting of the non-perforated conducting strip 17, faces oppositely. Further it will be understood that the conducting strip in the end electrode has the same function already described of insuring thorough oxidation and reversely reduction of the active material.

The advantages of the new electrode in an alkaline storage battery are: 1. It has great capacity proportionate to its size, which is adapted to be unusually compact. 2. It is cheap to manufacture since it may be used without conducting filaments. 3. It is easily "formed". 4. It has low internal resistance and high current delivering capacity. 5. It does not distort.

In stating that the oxid material during the reducing operation is in briqueted form this does not mean that the material is necessarily in regular shaped bricks or tablets, although this is preferable, but it does mean essentially that the material is agglomerated into masses as distinguished from being reduced in fine or powder form.

The final briqueting of the material may consist of packing it directly into the pocket of the containing envelop and this equivalent is intended to be covered by this briqueting step in the claims.

Some of the equivalents for the purpose of this invention of nickel oxid and the other materials specifically named herein have already been pointed out, and such expressions as "nickel oxid", etc., in the claims are intended to include these and all other equivalents within the spirit of the invention.

What I claim is:

1. The process of making an active material for a storage battery electrode which comprises briqueting a nickel oxid, reducing it in said briquets by heat in a reducing atmosphere, submerging the hot reduced material in an alkali solution, grinding the damp material, drying it and rebriqueting.

2. The process of making an active material for a storage battery electrode which comprises briqueting a nickel oxid, reducing it in said briquets by heat in a reducing atmosphere, submerging the hot reduced material in an alkali solution, and mixing and rebriqueting this material with a nickel hydrate or its equivalent.

3. The process of making an active material for a storage battery electrode which comprises briqueting a nickel oxid, reducing it in said briquets by heat in a reducing atmosphere, submerging the hot reduced material in an alkali solution, grinding the damp material, drying it, mixing it with a nickel hydrate or its equivalent and rebriqueting.

4. The process of making an active material for a storage battery electrode which comprises briqueting a nickel oxid, reducing it in said briquets by heat in a reducing atmosphere, and then without substantial exposure to the air treating the reduced material with an alkali solution.

5. The process of making an active material for a storage battery electrode which comprises briqueting a nickel oxid, reducing it in said briquets by heat in a reducing atmosphere, and then without substantial exposure to the air treating the reduced material with an alkali solution and briqueting the resulting material.

6. The process of making an active material for a storage battery electrode which comprises briqueting a nickel oxid, reducing it in said briquets by heat in a reducing atmosphere, and then without substantial exposure to the air treating the reduced material with an alkali solution, mixing with nickel hydrate and briqueting the resulting material.

7. The process of making an active material for a storage battery electrode which comprises briqueting a nickel oxid, reducing it in said briquets by heat in a reducing atmosphere, and then without substantial exposure to the air treating the reduced material with an alkali solution, and mixing the resulting material with a proportion of a metallic hydrate to facilitate thorough oxidation of the mass in "forming" the electrode wherein the material is used 8. The process of making an active material for a storage battery electrode which comprises briqueting and then reducing a nickel oxid and then without substantial exposure to the air treating the reduced material with an alkali solution.

9. The process of making an active material for a storage battery electrode which comprises briqueting and then reducing a nickel oxid and then without substantial exposure to the air treating the reduced material with a non-oxidizing liquid.

10. The process of making an active material for a storage battery electrode which comprises briqueting and then reducing a nickel oxid and then without substantial exposure to the air treating the reduced material with a non-oxidizing liquid, and briqueting the resulting material.

11. The process of making an active material for a storage battery electrode which comprises briqueting and then reducing a nickel oxid and then without substantial exposure to the air treating the reduced material with a non-oxidizing liquid, draining off said solution, grinding the damp material, drying and briqueting it.

12. The process of making an active material for a storage battery electrode which comprises briqueting and then reducing a nickel oxid by heat in a reducing atmosphere, the heat being moderated so as not to melt or fuse the reduced material particles, and then without substantial exposure to the air treating the reduced material with an alkali solution.

13. The process of making an active material for a storage battery electrode which comprises briqueting the black sesquioxid of nickel, reducing it in said briquets by heat in a reducing atmosphere, submerging the hot reduced material in an alkali solution, grinding the damp material with a nickel hydrate, and rebriqueting.

14. The process of making an active material for a storage battery electrode which comprises briqueting the black sesquioxid of nickel, reducing it in said briquets by heat in a reducing atmosphere, submerging the hot reduced material in an alkali solution, and mixing and rebriqueting this material with a nickel hydrate.

15. The process of making an active material for a storage battery electrode which comprises briqueting the black sesquioxid of nickel, reducing it in said briquets by heat in a reducing atmosphere, and then without substantial exposure to the air treating the reduced material with an alkali solution.

16. The process of making an active material for a storage battery electrode which comprises reducing the black sesquioxid of nickel in briquet form, and then without substantial exposure to the air treating the reduced material with an alkali solution.

17. The process of making an active material for a storage battery electrode which comprises briqueting black anhydrous sesquioxid of nickel, reducing it in said briquets by heat in a reducing atmosphere, and then without substantial exposure to the air treating the reduced material with an alkali solution.

18. The process of making an active material for a storage battery electrode which comprises reducing the black anhydrous sesquioxid of nickel in briquet form, and then without substantial exposure to the air covering the reduced material with a non-oxidizing liquid.

19. The process of making an active material for a storage battery electrode, which comprises reducing a nickel oxid in briquet form by heat in a reducing atmosphere at a temperature which does not substantially melt or fuse the particles, and then cooling the material out of contact with the air.

20. The process of making an active material for a storage battery electrode, which comprises reducing a nickel oxid in briquet form by heat in a reducing atmosphere at a temperature which does not substantially melt or fuse the particles, and then cooling the material out of contact with the air, and regrinding and briqueting the material.

In testimony whereof I affix my signature in presence of two witnesses.

HARRY CROSS HUBBELL.

Witnesses:
E. W. Scherr, Jr.,
S. S. Newton.

---

Copies of this patent may be obtained for five cents each, by addressing the "Commissioner of Patents, Washington, D. C."